United States Patent [19]

Shamah et al.

[11] Patent Number: 4,883,396
[45] Date of Patent: Nov. 28, 1989

[54] DUAL EXPANSION AND NON-EXPANSION ANCHOR

[75] Inventors: Alfred A. Shamah; James R. Schroeder, both of York, Pa.

[73] Assignee: U.S.E. Diamond, Inc., York, Pa.

[21] Appl. No.: 232,698

[22] Filed: Aug. 15, 1988

Related U.S. Application Data

[63] Continuation-in-part of Ser. No. 147,246, Jan. 22, 1988, Pat. No. 4,772,166.

[51] Int. Cl.⁴ .................... F16B 25/00; F16B 13/06
[52] U.S. Cl. .................................. 411/55; 411/65; 411/387; 52/426
[58] Field of Search ............ 52/42.6, 509, 512, 562; 411/24, 32, 55, 57, 60, 65, 387; 405/259, 260

[56] References Cited

U.S. PATENT DOCUMENTS

| | | | |
|---|---|---|---|
| 683,082 | 9/1901 | Summerer | 411/28 |
| 2,525,198 | 10/1950 | Beijl | 411/26 |
| 2,573,928 | 11/1951 | Peter | 411/24 |
| 3,139,730 | 7/1964 | Williams et al. | 405/259 |
| 4,078,471 | 3/1978 | Archibald et al. | 411/24 |

FOREIGN PATENT DOCUMENTS 62280 10/1982 European Pat. Off. .............. 411/27

*Primary Examiner*—Neill R. Wilson
*Attorney, Agent, or Firm*—Robert S. Stoll

[57] ABSTRACT

A dual expansion and non-expansion anchor comprising a pair of inner and outer expansion fasteners connected to each other by means of a screw-threaded connecting tie, said expansion fasteners being adjustable on the connecting tie to adjust to the spaced positions of an inner supporting structure and an outer supported wall. Insertion limiting means is provided to limit insertion of the inner fastener into the inner supporting structure in order to fix the position of said inner fastener in said supporting structure. Torque applying means applied to the connecting tie inserts and sets the inner fastener. Torque applying means applied to a nut on the connecting tie expands the outer expansion fastener.

7 Claims, 4 Drawing Sheets

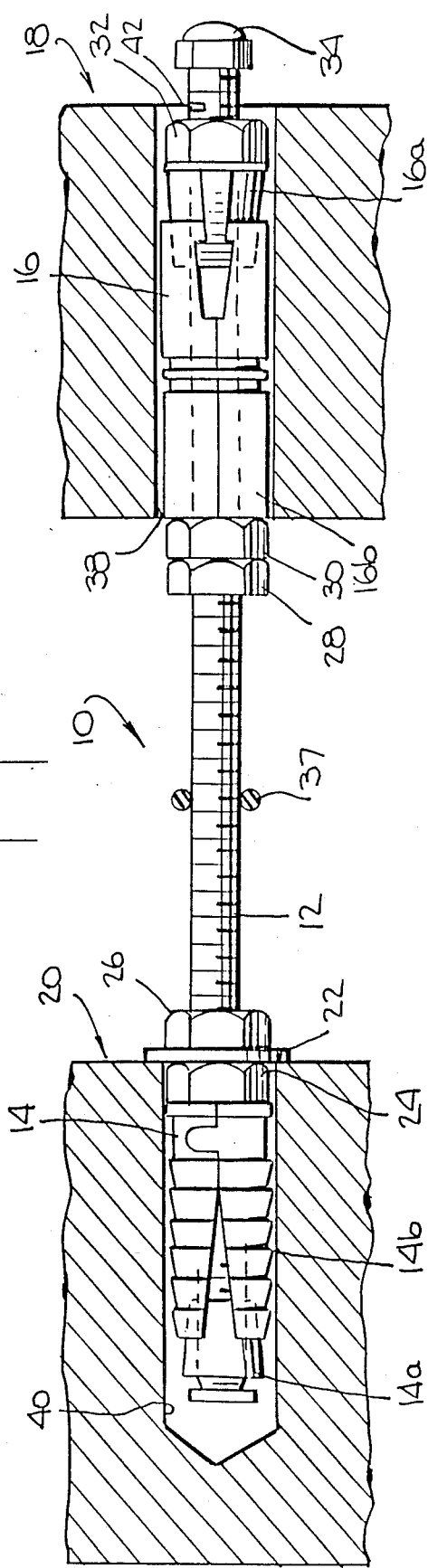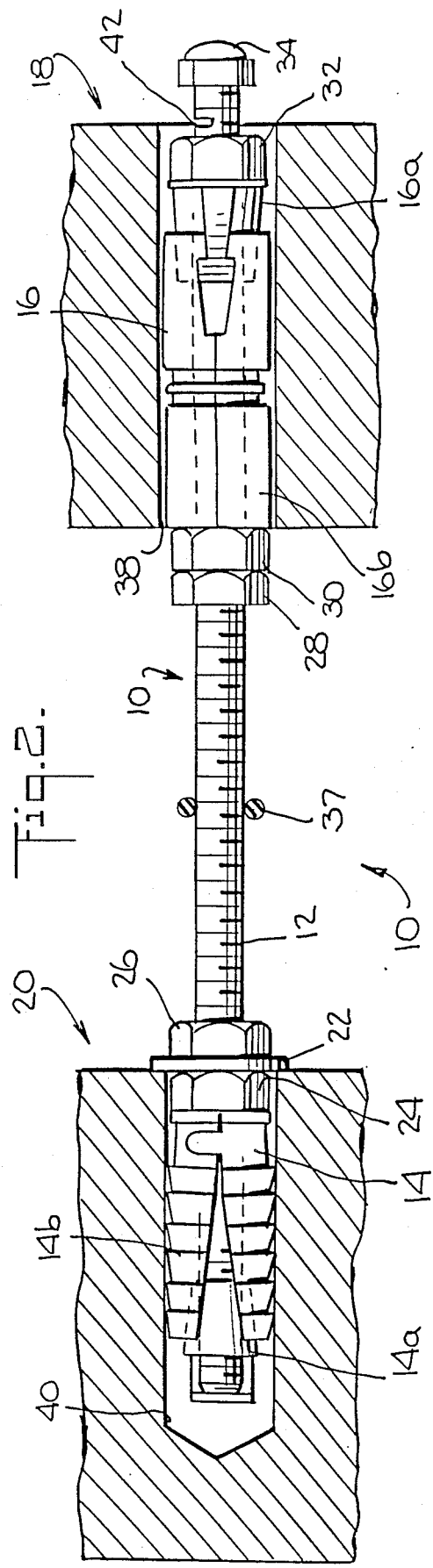

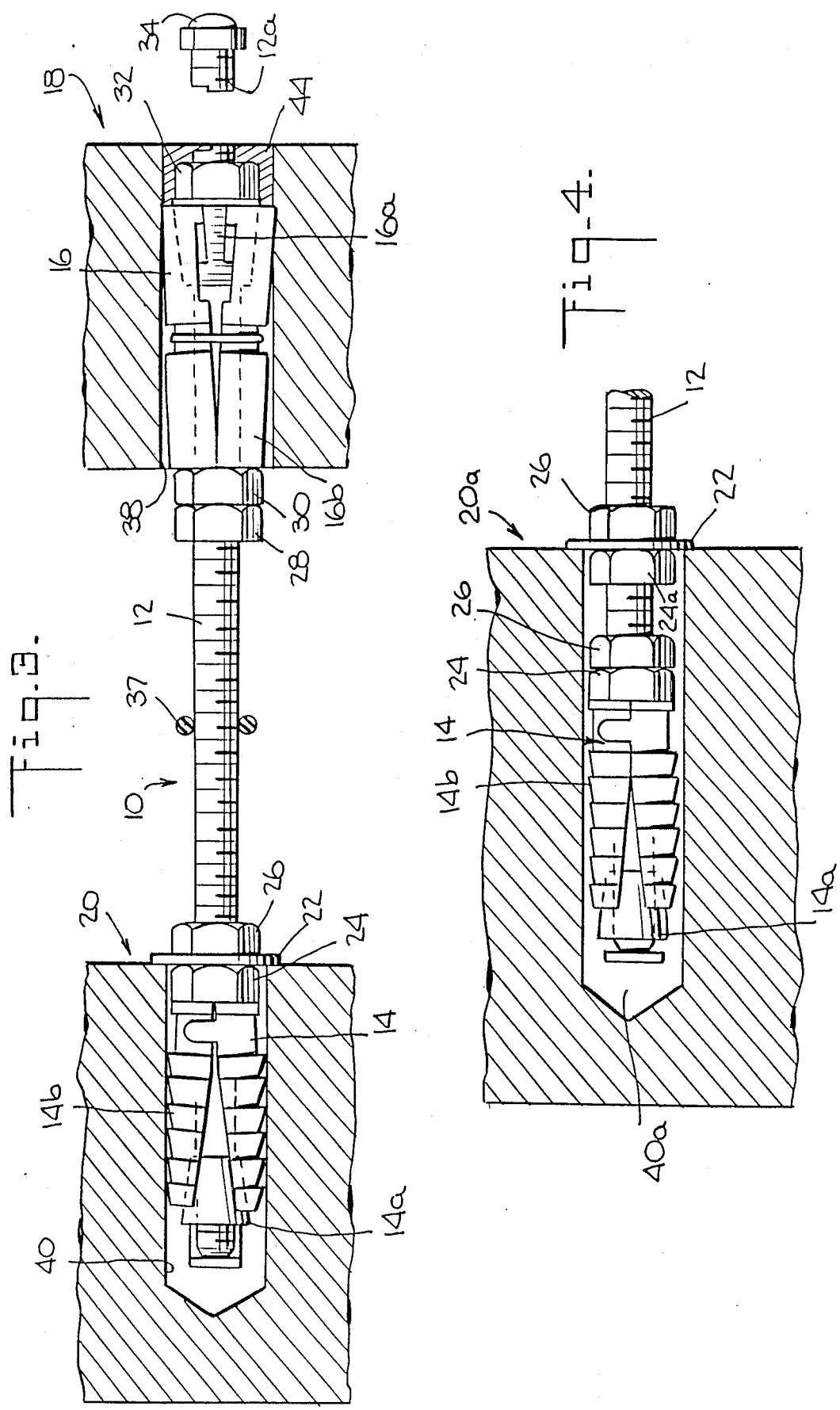

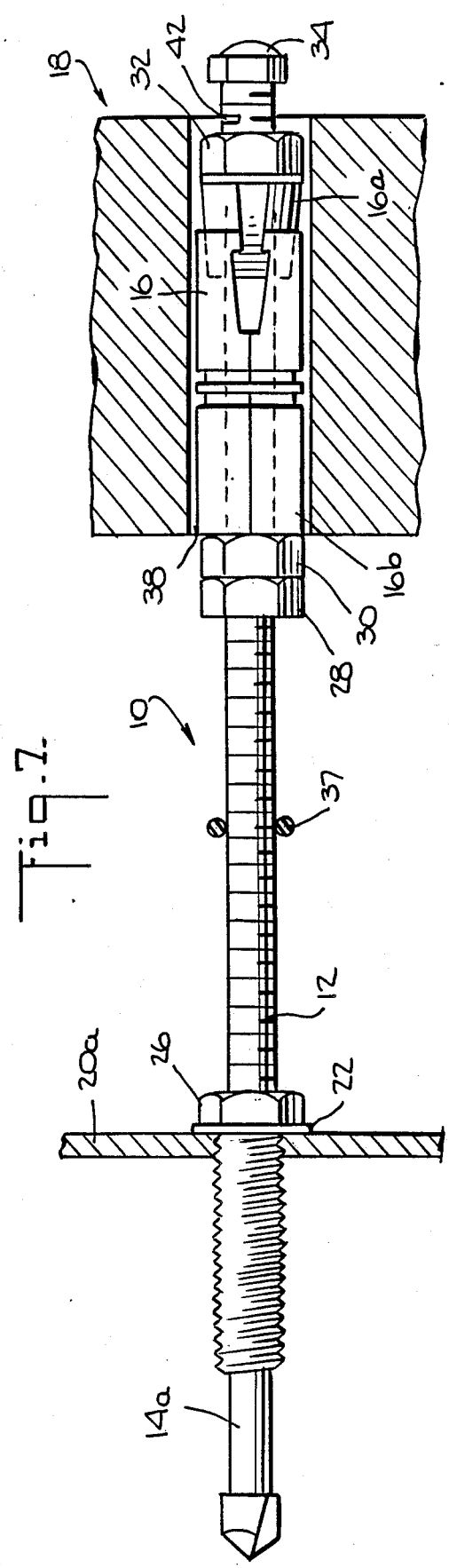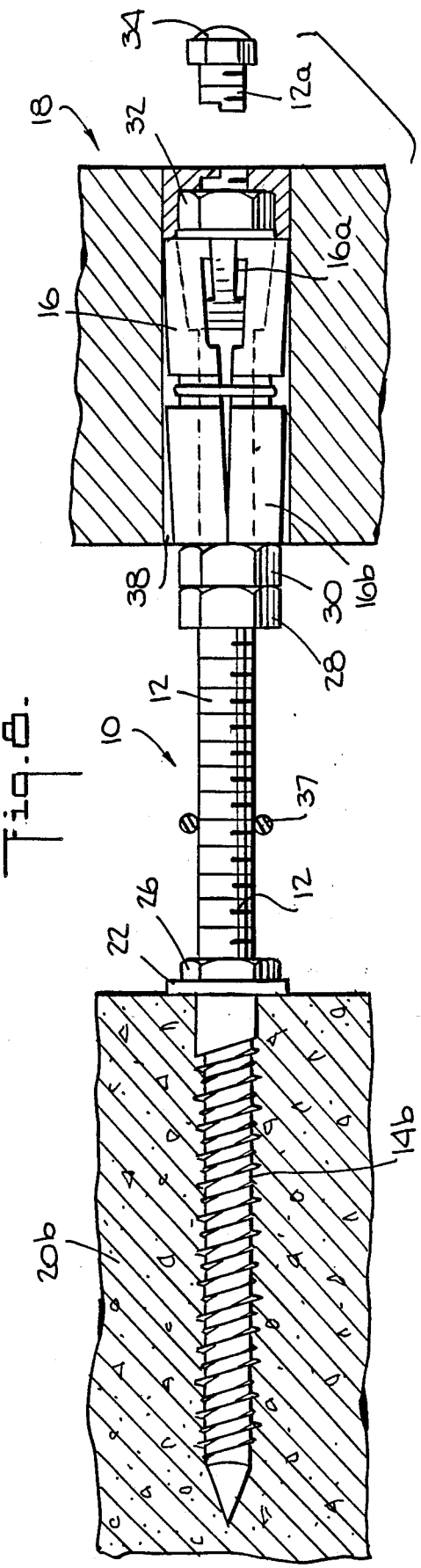

DUAL EXPANSION AND NON-EXPANSION ANCHOR

REFERENCE TO RELATED APPLICATION

This is a continuation-in-part of parent patent application Ser. No. 07/147,246, filed Jan. 22, 1988, entitled Dual Expansion Anchor, now Pat. No. 4,772,166, issued Sept. 20, 1988. In said parent application, two expansion anchors are provided. In the present application, the inner fasteners may be any fastener, such as a self-drilling screw, self-tapping screw, a wood screw, a sheetmetal screw, or other self-anchoring fastener of a non-expansion type.

BACKGROUND OF THE INVENTION

1. Field of Invention

This invention relates to the use of expansion anchors in combination with non-expansion anchors, in the placement, replacement or repair of non-loadbearing facades on buildings and other structures.

2. Prior Art

Dual expansion anchors having individually operable expansion fasteners are known to the prior art for the stated purpose.

The closest patents known to applicants are the following:
:2,892,226 Bradney
:3,296,919 Williams
:3,922,831 Fischer
:3,937,121 Schubert
:4,050,346 Fischer
:4,053,982 Weissman
:4,094,223 Fischer
:4,366,651 Thomas et al
:4,631,889 Adam et al The closest prior publications and competitive products on the market known to applicants are the following:
  a. The Construction Specifier, June, 1984 "Solving Problems Through Reanchoring", S. H. Getz, pp. 72-4;
  b. Dur-O-Wal, Inc., Northbrook, Ill. 60062, Dur-O-Wal Repair Anchor, Technical Bulletin 85-14; and
  c. Hilti (Canada) Limited, Bramalea, Ontario, Canada, Hilti Wall-Tie, the Remedial Anchor for Cavity Walls.

But applicants have no knowledge of any prior art having the following features:
  a. A single axis dual anchor having a standard expansion fastener mounted on a standard threaded rod functioning as a connecting tie;
  b. A dual anchor wherein the expansion fastener and a second anchor are adjustable on the connecting tie to adjust the spacing between them; and
  c. A dual expansion anchor capable of being set and tested as to each fastener separately with no cross wall or lateral stress during or after set in either wall.

SUMMARY OF THE INVENTION

The present invention comprises a single axis dual anchor which is adapted for use in installing, replacing or repairing facades on buildings or for other uses adapted to single axis dual anchors. For purposes of illustration and economy of space, the invention will be discussed in connection with building facade work.

Building wall and facade materials may differ from building to building. Different fasteners may be suited to the different materials. The use of a standard expansion fastener together with a standard non-expansion self-anchoring fastener makes it possible to adapt the type of fasteners to the types of materials. Illustrative of the standard expansion fasteners that are suited for this invention are the expansion fasteners that are made and sold under the registered trademarks Forway and Keystone by U.S.E. Diamond, Inc., 500 State Street, York, Pa. 17405.

Building wall and facade thicknesses and other specifications may also differ from building to building. The use of standard expansion and non-expansion fasteners makes it possible to adapt the dimensions of the fasteners to the requirements of the installation. The use of a standard threaded rod as the connecting tie, and a breakaway cut at a selected location on said tie, makes it possible to terminate the tie at or within the outer face of facades of different thickness.

The spacing between building wall and facade may differ from building to building. The use of a standard threaded rod as the connecting tie for standard expansion and non-expansion fasteners makes it possible to adjust the relative positions of the fasteners on the connecting tie to adjust to the spacing of the building wall and facade. It is thereby possible to tie the building wall and facade together without creating a stress between them.

DESCRIPTION OF THE DRAWING

FIG. 1 is a sectional view through a building wall and a facade, showing a dual expansion anchor, made in accordance with the present invention, in place in registering holes in said wall and facade. The anchor shown on the left is referred to herein as the inner fastener and the anchor shown on the right is referred to herein as the outer fastener.

FIG. 2 is a view similar to that of FIG. 1, but showing the inner expansion fastener in expanded condition in the building wall.

FIG. 3 is a view similar to that of FIG. 2, showing the outer expansion fastener in expanded condition in the facade and the connecting tie broken away at the face of the facade.

FIG. 4 is a fragmentary view of the dual expansion anchor as shown in FIG. 1, but showing adjustable insertion limitation means for controlling the depth of insertion into the building wall.

FIG. 7 is a view similar to that of FIG. 1 but showing the non-expansion, self-drilling anchor of FIG. 5 as the inner fastener on the left side of the figure.

FIG. 8 is a view similar to that of FIG. 3 but showing the self-drilling anchor of FIG. 6 as the inner fastener on the left side of the figure.

DESCRIPTION OF DUAL-EXPANSION EMBODIMENT OF THE INVENTION

Figure 5:
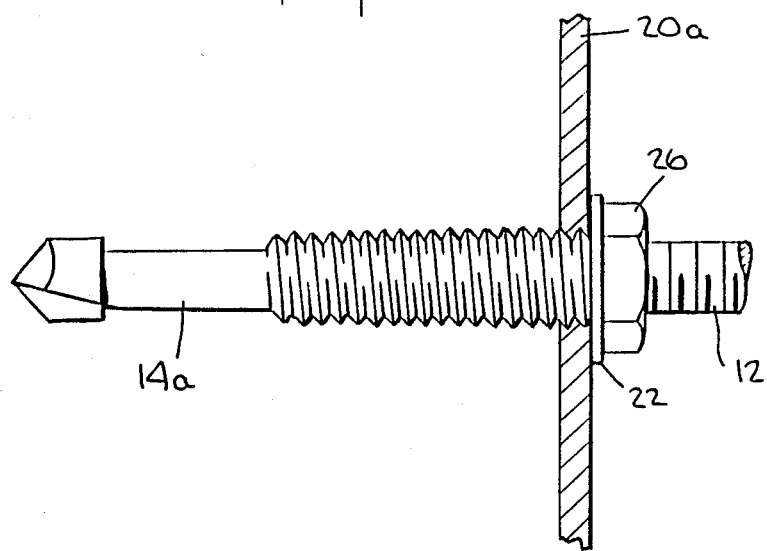
FIG. 5 is a fragmentary view similar to that of FIG. 4, but showing a non-expansion self-drilling anchor as the inner fastener.

The dual expansion anchor 10 shown in FIGS. 1-4 of the drawing comprises a connecting tie 12 in the form of a threaded rod, an inner expansion fastener 14 and an outer expansion fastener 16. What this dual expansion anchor does is to tie facade (outer wall) 18 to building wall (inner wall) 20.

For illustration purposes, inner expansion fastener 14 will be deemed to be a standard ¼"D expansion fastener, outer expansion fastener 16 will be deemed to be a standard ⅜"D expansion fastener, and connecting tie 12 will be deemed to be a ¼"D threaded rod. The wedge nut 14a of the inner expansion fastener has a ¼"D threaded hole for screw-threaded engagement with connecting tie 12. The wedge nut 16a of the outer expansion fastener 16 has a 5/16"D threaded hole, too large for screw-threaded engagement with the ¼"D connecting tie 12.

It will be noted that behind inner expansion fastener 14, on connecting tie 12, are a washer 22 and nuts 24 and 26. These nuts lock themselves and the washer in place on the connecting tie and they serve as a backstop for the expansion sleeve 14b. Washer 22 has a diameter between ¼' and ⅝", for example, 9/16". The reason for this dimension will shortly be explained.

It will also be noted that behind outer expansion fastener 16, on connecting tie 12, is a pair of nuts 28 and 30 that lock themselves to connecting tie 14. These nuts (and particularly nut 30) serve as a backstop for the expansion sleeve 16b. Another nut 32 on the connecting tie abuts wedge nut 16a of the outer expansion fastener.

The dual expansion anchor has one more element, an acorn nut 34, at the outer end of the connecting tie. The dual expansion anchor may also have an "O" ring 37 on its connecting tie to serve as a moisture barrier between the building wall and the facade.

In the use of the present embodiment, registering holes 38 and 40 are drilled into facade 18 and building wall 20 respectively. Hole 38 has a ⅜" diameter with sufficient clearance to accommodate the ⅜"D expansion fastener 16. Hole 40 has a ¼" diameter with sufficient clearance to accommodate the ¼"D expansion fastener 14. The two expansion fasteners are spaced on the connecting tie to correspond to the desired spacing of the building wall and facade. Should the spacing of the expansion fasteners require adjustment this may be done by adjusting the positions of nuts 28, 30 and 32. Expansion fastener 16 is longitudinally slidable on the connecting tie by reason of the 5/16"D hole in the fastener and the ¼"D of the connecting tie.

Inner expansion fastener 14 is properly positioned in hole 40 by reason of the presence of washer 22 that serves as a stop against building wall 20. See FIG. 1. And inner expansion fastener 14 is the first to be set. This operation is performed by applying a torque tool, e.g., a torque wrench, to acorn nut 34. The result is shown in FIG. 2 wherein expansion fastener 14 is shown expanded in hole 40. Shear and tension can now be tested independently of outer expansion fastener 16.

Outer expansion fastener 16 is properly positioned in hole 38 by reason of the above described adjustment of the position of said expansion fastener on connecting tie 12 relative to the inner expansion fastener 14. To expand outer expansion fastener 16 in hole 38, the outer end 12a of the connecting tie 12 is broken away at break-off cut 42. This exposes nut 32 for engagement with a torque tool such as a torque wrench. See FIG. 3. By tightening nut 32 against wedge nut 16a sleeve 16b is caused to expand against the wall of hole 38. Shear and tension can now be tested independently of the inner expansion fastener 14. The installation of the dual expansion anchor comprising the present invention is now complete, but for appearance purposes, a filler 44 may be inserted into the outer end of hole 38 to conceal nut 32 and connecting tie 12. See FIG. 3.

Referring to FIG. 4, it will be seen that washer 22 has been removed from between nuts 24 and 26. These two nuts are now locked directly to each other and to connecting tie 12. Washer 22 is now placed between two additional nuts 24a and 26a which lock to the connecting tie.

It will be understood that nuts 24a and 26a are adjustably positionable on the connecting tie and, consequently, washer 22 will now function as an adjustable insertion limitation means for expansion fastener 14. As shown in FIG. 4, building wall 20a is thicker than building wall 20 of FIGS. 1–3 and expansion fastener 14 is inserted more deeply into hole 40a in wall 20a than into hole 40 in wall 20. This requires moving washer 22 and locking nuts 24a and 26a away from nut 26 a distance corresponding to the added depth of insertion desired.

DESCRIPTION OF THE PREFERRED EMBODIMENT

Figure 6:
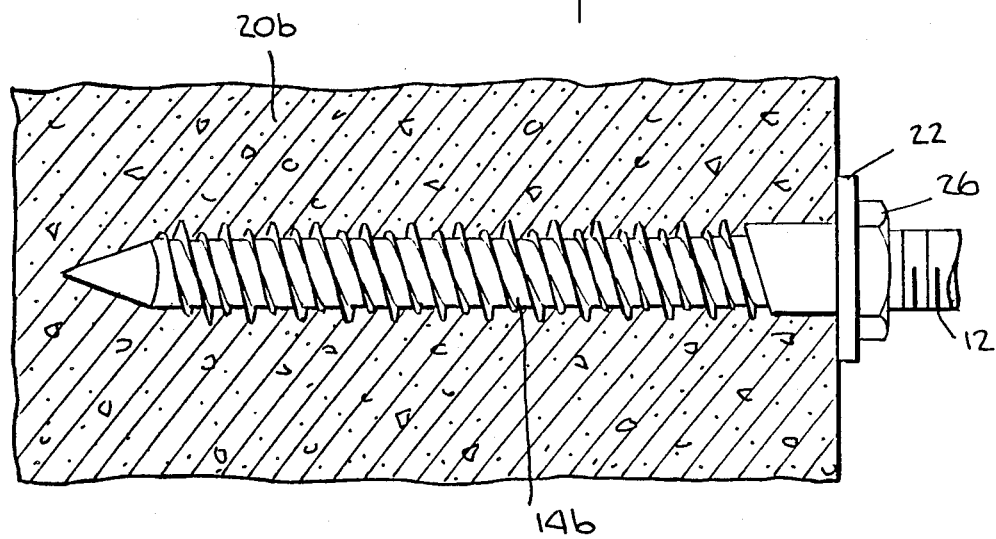
FIG. 6 is a fragmentary view similar to that of FIG. 4, but showing a non-expansion self-threading anchor as the inner fastener.

In the invention of the present application, it is preferred to utilize outer expansion fastener 16 together with an inner non-expansion anchor, joined co-axially by means of connecting tie 12. The inner non-expansion anchor may be a known self-drilling anchor 14a as shown in FIG. 5 for use with a metal stud 20a as the inner structural support, a known self-threading anchor 14b as shown in FIG. 6 for use with masonry, concrete or other inner structural support 20b, or other non-expansion type anchor.

A suitable self-drilling anchor 14a for use with metal studs is sold by National Wire Products Industries, Inc., 8203 Fischer Road, Baltimore, Md. 21222 under the name NWSD. When used in combination with outer expansion anchor 16 and connecting tie 12, the product sold is sold by the same company under the name Perma-Tie SD, a trademark of that company. A suitable self-tapping, self-drilling anchor for use as the inner non-expansion anchor herein for fastening to structural steel beams or columns is Dril-It, a registered trademark of Elco Industries, Inc., and is sold in combination with outer expansion anchor 16 and connecting tie 12 under the name Perma-Tie MDI, a trademark of National Wire Products Industries, Inc. A suitable self-threading anchor 14b for use in masonry or concrete 20b is sold under the name Tapcon, a registered trademark of Illinois Tool Works, Inc., and is sold in combination with outer expansion anchor 16 and connecting tie 12 under the name Perma-Tie MTC, a trademark of National Wire Products Industries, Inc.

The inner non-expansion anchor may be driven into and set separately from outer expansion anchor 16 in a manner such as to permit individual anchoring of the dual anchor to the structural support or building wall 20 and thence to the facade or outer wall 18.

The foregoing is illustrative of a preferred form of the invention and it will be understood that modifications of this form as well as other forms are contemplated within the scope of the appended claims. For example, the particular types of expansion and non-expansion fasteners shown in the drawing illustrate the many kinds of standard fasteners that may be used in the invention.

We claim:
1. A dual anchor comprising:
   a. a screw-threaded connecting tie,
   b. a first non-expansion fastener on said connecting tie at one end thereof, c. a second expansion fastener on said connecting tie at the opposite end thereof;
d. a wedge nut of said second expansion fastener mounted on, but free from threaded engagement with, said connecting tie,
e. first stop means on said connecting tie engaging a structural member for said first non-expansion fastener,
f. said first non-expansion fastener being rotatable when the connecting tie is rotated to insert it into said structural member and secure it thereto,
g. second stop means on said connecting tie engaging an expansion sleeve of the second expansion fastener,
h. an additional nut threaded to said connecting tie,
i. said additional nut abutting the wedge nut of the second expansion fastener, and
j. the expansion sleeve of the second expansion fastener being expandable when the additional nut is rotated relative to the connecting tie to drive said wedge nut of the second expansion fastener against said expansion sleeve.

2. A dual anchor in accordance with claim 1, wherein:
a. said second stop means comprises a pair of nuts threaded to the connecting tie, and
b. the individual nuts of said pair of nuts being tightened against each other to lock them to said connecting tie.

3. A dual anchor in accordance with claim 1, wherein:
a. one end of the connecting tie extends beyond said additional nut, and
b. torque tool engaging means being provided on said end of the connecting tie,
c. whereby applying a torque force to said torque tool engaging means causes rotation of the connecting tie to insert and fasten the first non-expansion fastener.

4. A dual anchor in accordance with claim 3, wherein the torque tool engaging means is an acorn nut threaded to said end of the connecting tie.

5. A dual anchor in accordance with claim 3, wherein:
a. a break-off cut is formed in the end of the connecting tie that extends beyond the additional nut, and
b. whereby said end of the connecting tie can be broken away at the break-off cut to expose the additional nut for engagement with a torque force applying tool.

6. A dual anchor in accordance with claim 1, wherein:
a. the second stop means is threaded for engagement with the connecting tie, and
b. the second expansion fastener is longitudinally adjustable on the connecting tie by longitudinally adjusting said second stop means and said additional nut.

7. A dual anchor in accordance with claim 1, wherein:
a. said first stop means comprises longitudinally adjustable insertion limiting means provided on the connecting tie between the first and second fasteners,
b. whereby longitudinal adjustment of said insertion limiting means relative to said connecting tie adjusts the depth of insertion of the first non-expansion fastener into a hole in said structural member.

* * * * *